Aug. 28, 1934.   C. J. GREINER ET AL   1,972,062
MACHINE FOR MAKING SANITARY NAPKINS
Filed Nov. 17, 1933   7 Sheets-Sheet 2
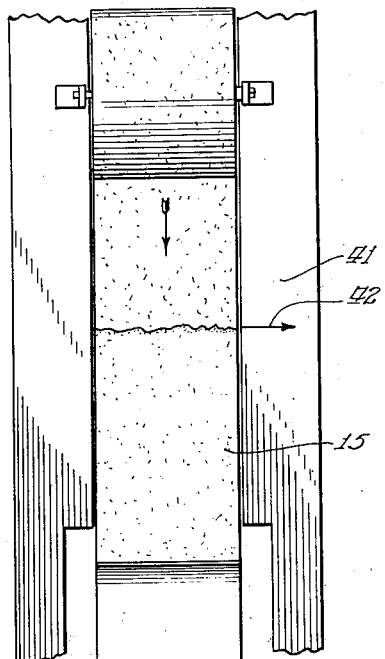
Fig. 2
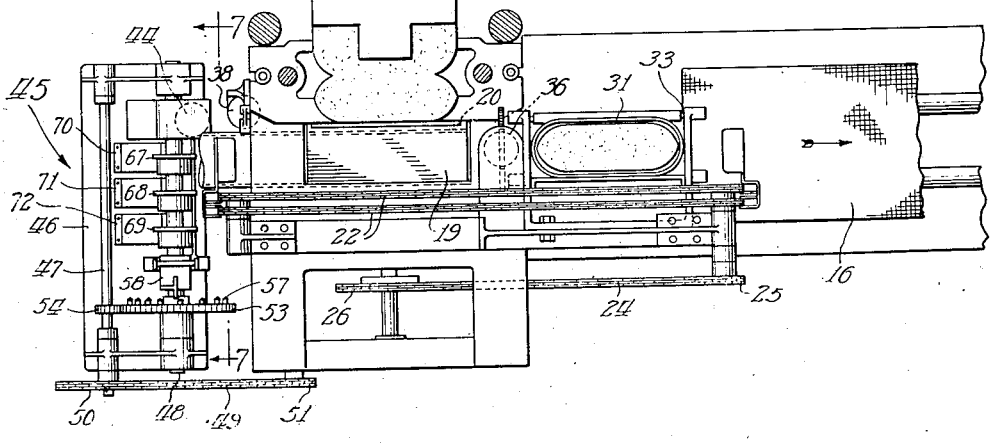
Inventors
Charles J. Greiner
Oscar T. Thompson
By: Fisher, Clapp, Evans & Pond   Attys Aug. 28, 1934.  C. J. GREINER ET AL  1,972,062
MACHINE FOR MAKING SANITARY NAPKINS
Filed Nov. 17, 1933  7 Sheets-Sheet 4

Inventors:
Charles J. Greiner
Oscar T. Thompson
By: Fisher, Clapp, Soans & Pond
Attys.

Aug. 28, 1934. C. J. GREINER ET AL 1,972,062
MACHINE FOR MAKING SANITARY NAPKINS
Filed Nov. 17, 1933  7 Sheets-Sheet 5

Inventors:
Charles J. Greiner
Oscar T. Thompson
By Fisher, Clapp, Soans & Pond
Attys Aug. 28, 1934.  C. J. GREINER ET AL  1,972,062
MACHINE FOR MAKING SANITARY NAPKINS
Filed Nov. 17, 1933  7 Sheets-Sheet 6
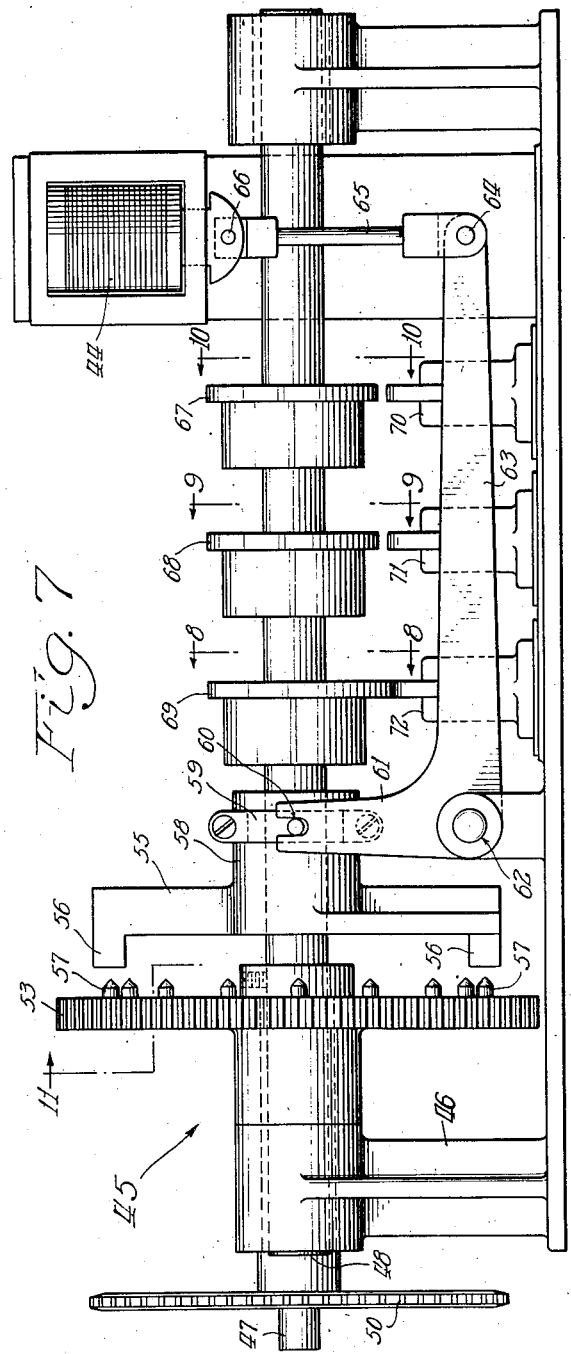
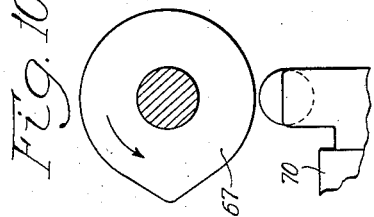
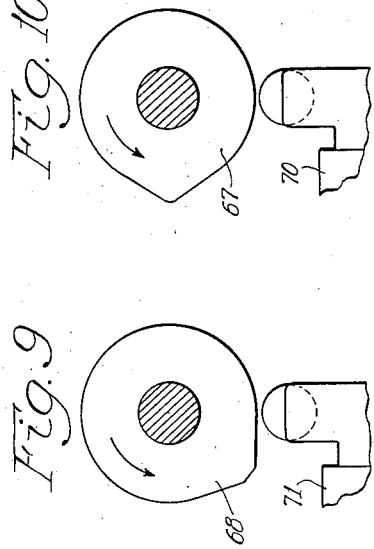
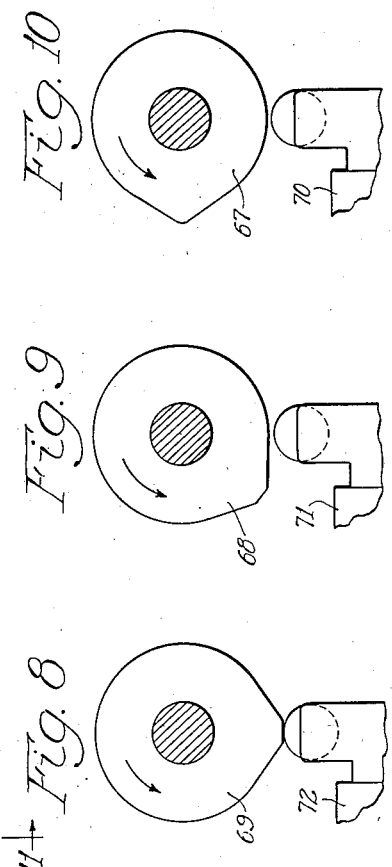
Inventors:
Charles J. Greiner
Oscar T. Thompson
By: Fisher, Clapp, Soans & Pond Attys Aug. 28, 1934. C. J. GREINER ET AL 1,972,062.
MACHINE FOR MAKING SANITARY NAPKINS
Filed Nov. 17, 1933 7 Sheets-Sheet 7

Inventors:
Charles J. Greiner
Oscar T. Thompson
By: Fisher, Clapp, Soans & Pond
Attys Patented Aug. 28, 1934

1,972,062

UNITED STATES PATENT OFFICE 1,972,062

MACHINE FOR MAKING SANITARY NAPKINS

Charles J. Greiner, Menasha, and Oscar T. Thompson, Neenah, Wis., assignors to International Cellucotton Products Company, Chicago, Ill., a corporation of Delaware Application November 17, 1933, Serial No. 698,464

12 Claims. (Cl. 223—15)

This invention relates to machines for making sanitary napkins and has for its main object the provision of means for automatically replacing a defective absorbent pad element in such a manner that the normal and continuous operation of the machine need not be interrupted.

In this application, mechanism for accomplishing the object indicated above is illustrated as applied to a sanitary napkin machine of the type illustrated in the patent to William Bauer No. 1,794,358, issued March 3, 1931, but it will of course be understood that the mechanism may be applied to other types of machines, only minor changes well within the skill of the ordinary mechanic being required to modify certain parts to fit such other machines.

Other objects and advantages of the invention will be understood by reference to the following specification and accompanying drawings (7 sheets), wherein there is illustrated a sanitary napkin machine of the type above identified to which the pad replacing mechanism has been added.

In the drawings—

Fig. 2 is a plan;

Figure 3:
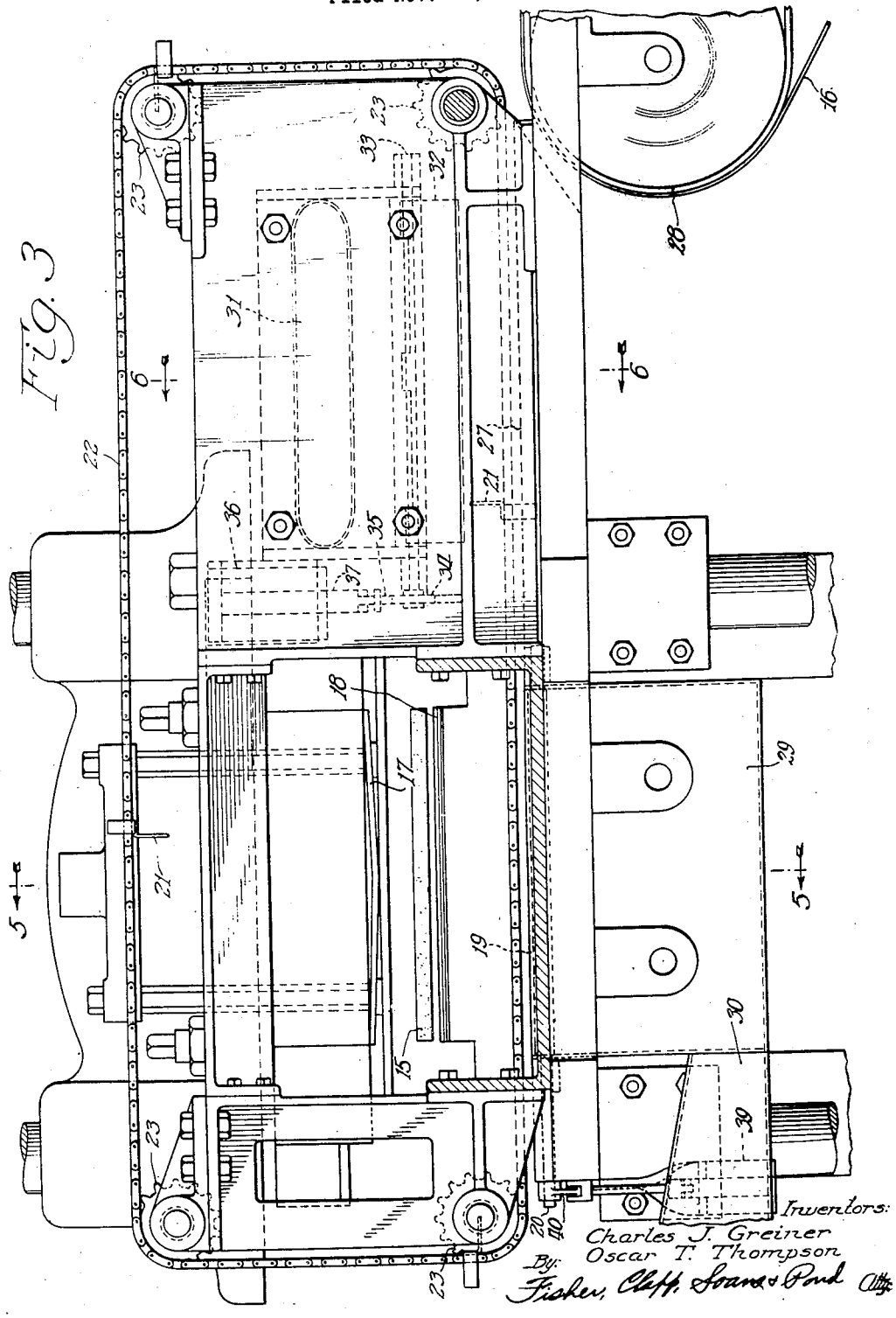
Fig. 3 is a front elevation corresponding to a portion of Fig. 1 but showing the parts on an enlarged scale.
Figure 4:
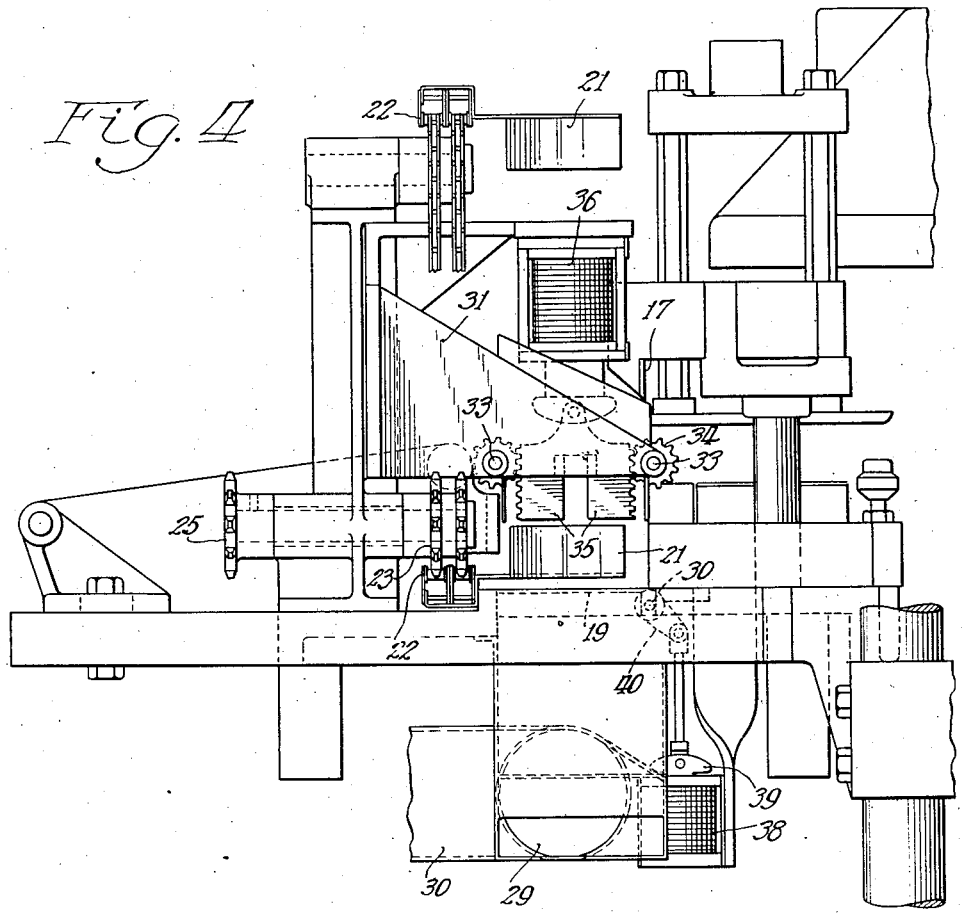
Fig. 4 is an elevation of the mechanism shown in Fig. 3.
Figure 5:
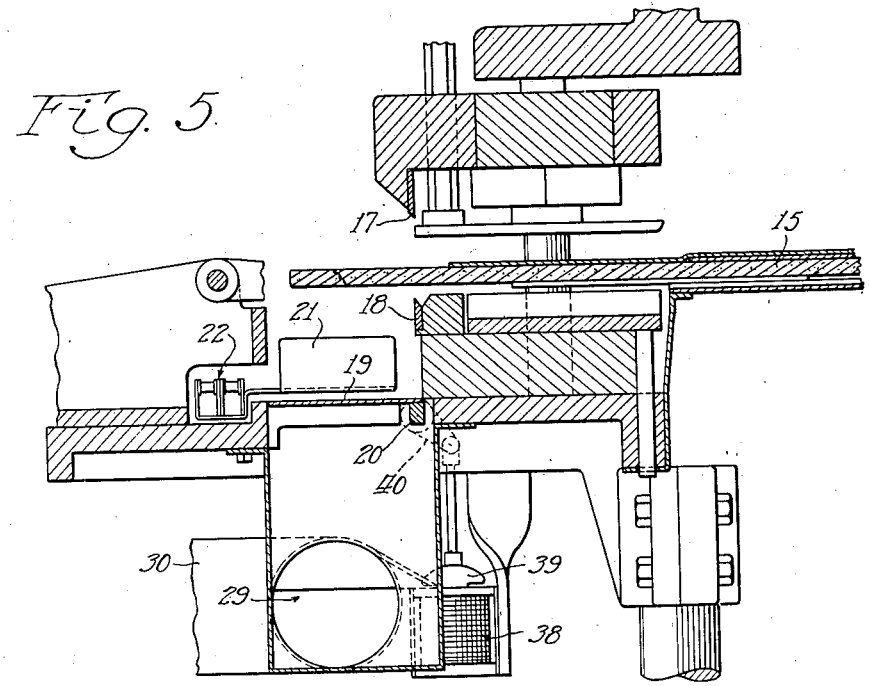
Figure 6:
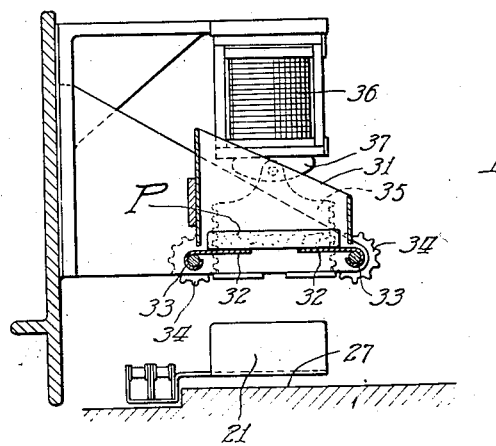
Figure 11:
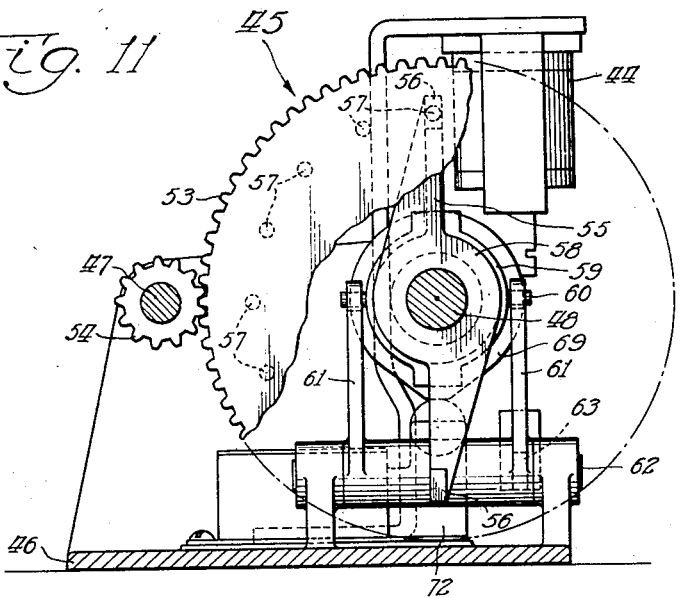
Figure 12:
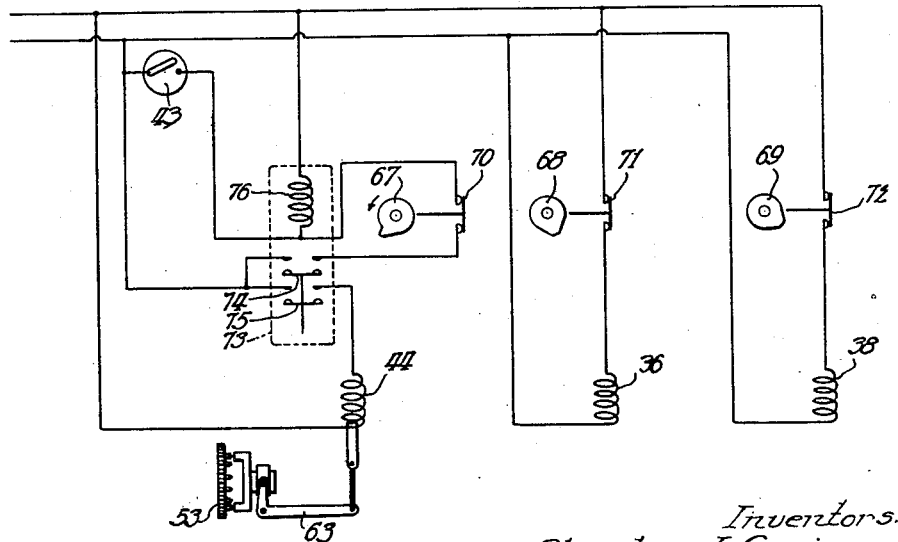

Figs. 5 and 6 are sections on the lines 5—5 and 6—6 respectively of Fig. 3;

Fig. 7 is a side elevation of certain timing mechanism, the plane of the view being indicated by the lines 7—7 of Fig. 2;

Figs. 8, 9, 10 and 11 are sections on correspondingly numbered lines on Fig. 7; and Fig. 12 is an electric circuit diagram.

Referring now to the drawings, the Bauer type of machine as herein illustrated embodies relatively transversely extending feed lines, one of which is adapted to intermittently feed a strip of crepe paper or other wadding 15 from which absorbent pads are to be cut. The other feed line is adapted to propel continuously a strip of gauze or other suitable material indicated at 16, which is adapted to be folded around the pads as an incident to the forward movement of the gauze through certain folding devices such as shown in the Bauer patent.

As best shown in Figs. 1, 3, 4 and 5, the wadding strip 15 is fed between upper and lower knives 17 and 18 respectively. The knives are intermittently operated by suitable mechanism to cut off projecting end portions of the wadding strip, such end portions thereupon constituting absorbent pads which are to be inclosed in a wrapper of gauze.

As indicated in Fig. 3, when a pad is cut from the wadding strip 15, it will fall by gravity to a support 19 which is in the plane of the gauze strip 16. The member 19 is in the form of a pivoted plate. It is pivoted at one side as indicated at 20, suitable bearing supports being provided for the pivot pintle.

The pad thus deposited on the pivoted table member 19 is fed in a lengthwise direction, i. e., transversely of the direction of feed of the wadding strip, by means of pushers such as indicated at 21. The pushers 21 are carried by a double chain structure 22, the chain being located adjacent one side of the path of movement of the pads and guided by suitably mounted sprockets 23. The double chain 22 is driven through the agency of a chain 24 which is threaded around a sprocket 25 mounted on the shaft which carries one of the sprockets 23 and around another sprocket 26 which is driven in any suitable manner. In this instance, the sprocket 26 is carried by a shaft which is driven by a suitable chain connection to another driven shaft on the napkin making machine. The pushers 21 are so positioned on the chain 22 that they are operative to engage each pad deposited on the support 19 immediately after the pad is deposited, so that the forward movement of the pad is started with only a slight delay. The pad is fed lengthwise from the support 19 and over a continuation of the support indicated at 27, such continuation being, in effect, a part of the stationary framework of the mechanism. From the support 27, the pad is delivered to the gauze strip 16 which is propelled by means of a belt 28 which is suitably driven.

The wadding strips 15 are supplied in rolls and when one roll is nearly used up, another roll is supplied and the starting end of the new strip is adhesively or otherwise attached to the finished end of the preceding strip, thereby to continue the feed of the strip without interruption. However, such changing of the strips results in a portion which is unfit for use in a pad. When such unfit pad is deposited on the pivoted support 19, the support 19 is caused to swing downwardly about its pivot to thereby discharge such imperfect pad in a receptacle 29 from which it is withdrawn by suction through a tube 30. The pivot support 19 is controlled by means of a solenoid 38 which has an armature 39 connected to a lever 40, which in turn is connected to the pintle 20.

For replacing the defective discharged pad element, the following arrangement is provided: A pad positioning receptacle 31 is suitably mounted on the framework of the machine in such position that it will hold a pad over the normal path of movement of the pads. For supporting a pad in the receptacle 31, there are a pair of pivoted gates 32, 32 respectively disposed along opposite sides of the receptacle (see Figs. 2 and 6). The gates 32, 32 are carried by pintles such as indicated at 33, which are rotatably carried in suitably formed bearing bosses, and at one end of each of the pintles 33, 33 there is provided a pinion gear 34. A double rack 35 has its opposite edges in mesh with the respective pinion gears 34, 34, so that upon downward movement of the rack member, the gates will be swung downwardly so as to deposit a pad, such as indicated at P (Fig. 6), on the support 27 in front of one of the pushers 21. The movement of the rack 35 is preferably controlled by a solenoid 36 which has an armature 37 to which the rack is pivoted in any suitable manner. The pad P is placed in the positioning member 31 and on the pivoted gates 32, 32 by hand, to be in readiness for replacement of a defective pad.

The operation of the pivoted support 19 and the gates 32, 32 is initiated by an attendant of the machine whose duty it is to examine the wadding strip as it travels from the supply roll to the cutting knives. On a margin of the table 41 over which the wadding 15 travels, there is suitably applied an indicator 42. When a splice or other defect in the wadding passes the mark or indicator 42, the machine attendant closes an electric switch 43, which, in this instance, is illustrated as being arranged for foot operation (see Fig. 1). The electric switch 43 is connected to a solenoid 44 which serves to control the operation of timing mechanism indicated at 45.

Figure 1:
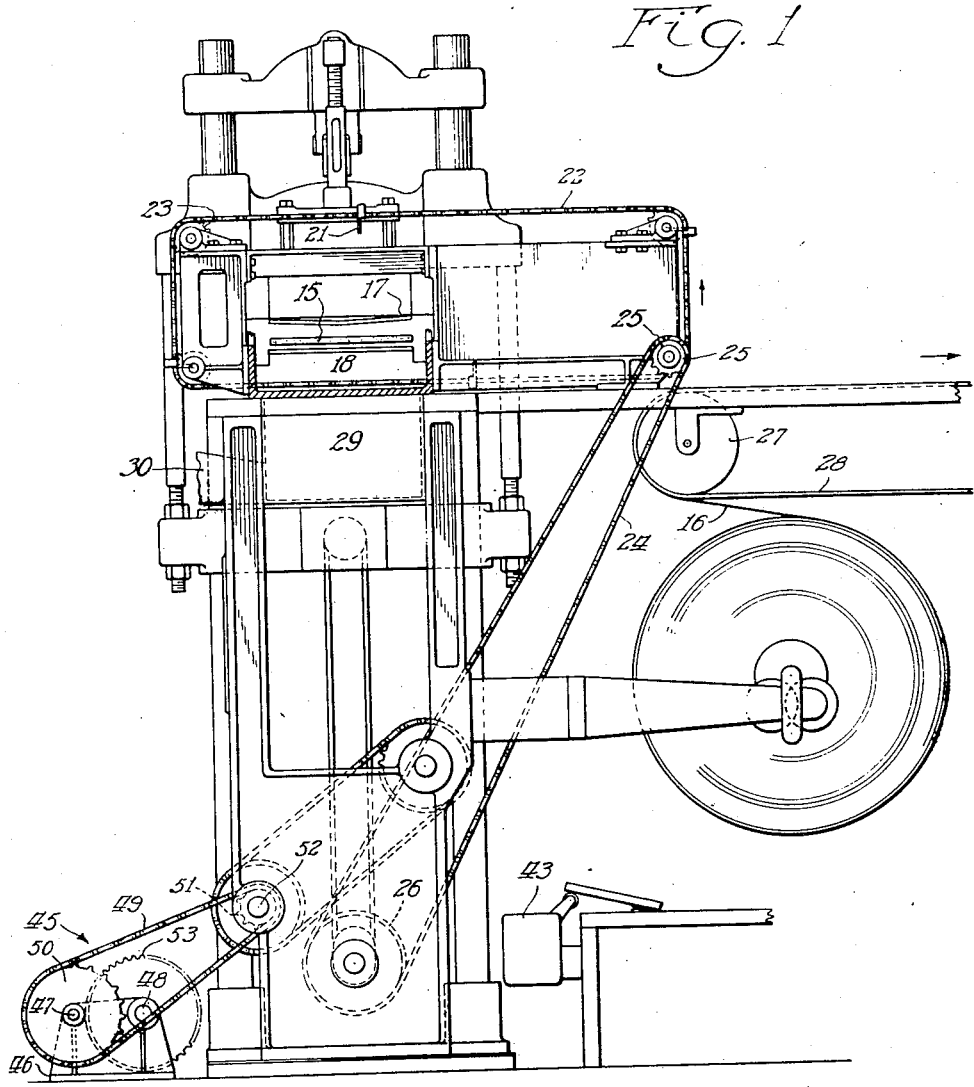
Fig. 1 is a front elevation.

The timing mechanism 45 embodies a suitable supporting frame structure 46 in which shafts 47 and 48 are suitably rotatably mounted. The shaft 47 is normally driven by means of a chain 49 which extends around sprockets 50 on the shaft 47 and 51 carried by a shaft 52 of the pad making machine. The shaft 52, as indicated in Fig. 1 of the drawings, is suitably driven as a part of the pad making machine proper. On the shaft 48 there is freely rotatably mounted a gear 53 which meshes with a pinion 54 carried by the shaft 47. Hence the gear 53 is normally driven.

A spider member 55 is keyed to the shaft 48 so as to be relatively non-rotatable but axially slidable and the spider is provided with teeth or similar projections 56, 56 which are adapted to be engaged with teeth or other suitable projections 57, 57 carried by the driven gear 53. As indicated in Fig. 11, the gear 53 has a plurality of said teeth 57 in the form of laterally projecting pins arranged in circumferential spaced relation, the position of the teeth or pins being such that one of them passes a given point each time a pad is cut off. In other words, each pin represents a pad section. The clutch mechanism thus has a series of engaging positions which effect a proper corelation between any given pad section and certain switch operating cams which will presently be described. Properly synchronized operation of the parts is thus attained.

The spider 55 is provided with a hub 58 over which a clutch collar 59 is suitably mounted. The clutch collar 59 is connected in a suitable manner, as indicated at 60, to the free end of the short arm 61 of a bellcrank pivoted as indicated at 62 on the timer unit frame. The other arm 63 of the bellcrank extends substantially horizontally and has its free end pivotally connected as indicated at 64 to one end of a link 65, the free end of which is pivoted as indicated at 66 to the adjacent end of the armature of the solenoid 44.

When the solenoid 44 is energized as a result of the closing of the switch 43, the clutch member 55 is moved into engagement with the clutch member 53 so that the shaft 48 will be driven.

The shaft 48 has mounted on it a series of cams designated 67, 68 and 69 respectively, these cams being operatively associated with electric switches 70, 71 and 72 respectively.

The cams 67, 68 and 69 are so arranged on the shaft that they successively operate their respective switches. The switch 72 is included in the circuit of the solenoid 38 which controls the pivoted member 19. The switch 71 is in the circuit of the solenoid 36 which controls the pivoted gates 32, 32. The switch 70 is included in the circuit of the solenoid 44 which controls the timing mechanism clutch.

The clutch controlling solenoid 44 has included in its circuit a double acting relay switch arrangement of well known form and represented only in the electric circuit diagram, Fig. 12. The relay is designated 73 and it includes circuit breakers 74 and 75. The circuit breakers 74 and 75 are controlled by a solenoid designated 76. As shown in the diagram, when the switch 43 is closed by the operator, the relay solenoid 76 is energized, with the result that the switch elements 74 and 75 are caused to close circuits as indicated. One of the circuits, which includes the switch 74, also includes the cam controlled switch 70 and the other circuit, which includes the switch 75, controls the clutch actuating solenoid 44. It will be seen that as soon as the relay solenoid 76 is energized, the switch 43 may be opened without de-energizing the timer clutch controlling solenoid 44.

The sequence of operation is as follows: When the switch 43 is closed, the timer clutch solenoid 44 is energized and engages the clutch mechanism to thereby effect rotation of the cam shaft 48. The switches 70, 71 and 72 are normally closed and the latter two switches normally retain the pivoted member 19 and the pivoted gates 32, 32 in their operative horizontal position, as illustrated in Figs. 5 and 6. The cam 69 first opens the switch 72, with the result that the circuit to the solenoid 38 is broken to thereby permit the pivoted member 19 to swing downwardly and discharge the imperfect pad section disposed thereon. The member 19 may be made heavy enough to overcome the weight of the solenoid armature 39, or suitable spring means may be utilized for this purpose. The cam 68 next opens the switch 71 to thereby break the circuit to the solenoid 36, whereby the rack 35 is permitted to move downwardly to swing the gates 32, 32 downwardly for the purpose explained. The downward movement of the rack 35 may result solely from the weight of the rack and the armature or other means, such as a spring, may be provided for insuring such downward movement. The cams 69 and 68 are so shaped that the respective switches controlled thereby are held open only a very short time, just sufficient to accomplish their respective purposes. As soon as the pads have been discharged from the respective parts, they may be restored to normal operative position. The cam 67 next opens the switch 70 to thereby deenergize the relay solenoid 76 and permit the switches 74 and 75 to open their respective circuits, whereby the timer clutch controlling solenoid 44 is again deenergized to restore the clutch to disengaged position, as shown in Fig. 7.

It will be understood that the cams on the cam shaft 48 are so arranged on the shaft that the respective solenoids will not be actuated until the defective pad section has traveled from the position indicated by the mark 42 to its resting place on the hinged support 19. The timing must be quite accurate but it is not difficult to make, since the cams may be turned on the cam shaft 48 and set in proper position by means of set screws or the like. Of course the shafts 47 and 48 are suitably synchronized in their rotation with other operating parts of the napkin making machine, so that the timing once set will remain operative.

The described arrangement for discharging defective pad sections and automatically replacing them with perfect pads eliminates considerable waste or loss incident to the packaging of an imperfect pad, or incident to the necessity for removal of one completed pad from a package and the substitution of another, it being understood that in connection with napkin making machines such as herein described, folding packaging mechanisms are also used, so that the operation of making and packaging pads is one continuous operation.

Changes in the described structure may be made without departing from the spirit of the invention, the scope of which should be determined by reference to the following claims, the same being construed as broadly as possible consistent with the state of the art.

We claim:

1. In a sanitary napkin machine of the class described, the combination of means for feeding a continuous wrapper strip, mechanism for severing a strip of wadding into separate pads and feeding the pads successively to said wrapper strip, means for folding the wrapper strip around the pads, and means for mechanically replacing a defective pad with a perfect pad while maintaining the normal operation of the machine.

2. In a sanitary napkin machine of the class described, the combination of means for feeding a continuous wrapper strip, mechanism for severing a strip of wadding into separate pads, means for successively receiving the pads, means for feeding the pads from said receiving means to said wrapper strip, means for folding the wrapper strip around such pads, and means selectively operable for discharging a pad on said receiving means and delivering a substitute pad to the normal position of the discharged pad.

3. In a sanitary napkin machine of the class described, the combination of means for feeding a wrapper strip, mechanism for severing a strip of wadding into separate pads, means for successively receiving the pads, means for feeding the pads from said receiving means to said wrapper strip, means for folding the wrapper strip around such pads, means for discharging a pad from said pad receiving means to prevent its delivery to the wrapper strip, and means operated as an incident to the operation of said discharging means for delivering a substitute pad to the normal position of the discharged pad.

4. In a sanitary napkin machine of the class described, the combination of means for severing a strip of wadding into separate pads, a pivoted support for successively receiving said pads, means for propelling a strip of wrapper material, means for feeding the pads successively from said pivoted support to said wrapper strip, means for positioning a substitute pad in juxtaposition to the normal path of movement of said pads, and selectively operable means for effecting swinging of said pad support to discharge a pad element thereon and for effecting delivery of said substitute pad from said holder to the normal position of said discharged pad.

5. In a sanitary napkin machine of the class described, the combination of means for feeding a strip of wadding and successively severing pads therefrom, a pivoted support for successively receiving such pads, means for propelling a strip of wrapper material, means for feeding the pads through a predetermined path of travel from said said support to position on said wrapper strip, pivotally mounted means for supporting a substitute pad in position overlying said predetermined path of travel intermediate said pivoted support and said wrapper strip, and selectively operable automatic means for effecting synchronized downward swinging movement of said pivoted support and said pivotally mounted means to thereby discharge a pad resting on said support and effect deposition of said substitute pad in said predetermined path of travel in the place of said discharged pad.

6. In a sanitary napkin machine of the class described, the combination of means for successively severing end portions from a strip of wadding to form pads, a pivoted support for successively receiving said pads, means for propelling a strip of wrapper material, means for successively feeding the pads from said pivoted support to said wrapper strip, pivoted pad supporting means overlying the normal path of movement of pads from said support to said wrapper strip and located intermediate said support and the strip, electrically controlled means for controlling both of said pivoted pad supporting means, mechanically operated switch means for actuating said electrically controlled means, and manually operable means for effecting operation of said mechanical switch operating means.

7. In a sanitary napkin machine of the class described, the combination of means for severing end portions from a strip of wadding to form pads, a pivoted support for successively receiving the pads, means for propelling a strip of wrapping material, means for successively feeding the pads from said pivoted support to said wrapper strip, pivoted means for holding a substitute pad in position overlying the normal path of movement of pads from the first mentioned pivoted support to said wrapper strip, automatic means for effecting swinging movement of both of said pivoted supports in synchronized relation for discharging a pad on said first mentioned support and for depositing a pad from said second mentioned support in the normal place of said discharged pad, and means selectively operable prior to the cutting of a pad portion from the strip for effecting operation of said automatic means when such pad portion of the strip is severed from the strip and deposited as a pad on the first mentioned support.

8. In a sanitary napkin machine of the class described, the combination of means for successively severing end portions from a strip of wadding to form pads, a pivoted support for successively receiving said pads, means for propelling a strip of wrapper material, means for successively feeding the pads from said pivoted support to said wrapper strip, pivoted means overlying the normal path of movement of pads from said support to said wrapper strip and located intermediate said support and the strip for positioning a pad over said path of movement, solenoids for controlling said pivoted pad supporting means, mechanically operated switch means for actuating said solenoids, and manually operable means for effecting operation of said mechanical switch operating means.

9. In a sanitary napkin machine of the class described, the combination of means for propelling a strip of wrapper material, means for feeding a strip of wadding, successively severing pads therefrom and depositing the pads in spaced relation on said wrapper strip, means for supporting a substitute pad in position overlying the normal path of travel of said pads, said means comprising a pair of pivoted members cooperating to support said substitute pad, pinion gears connected respectively to said members, and a rack meshing with both of said pinion gears, and means for effecting movement of said rack to effect downward swinging movement of said pivoted members to thereby effect delivery of said substitute pad to said wrapper strip.

10. In a sanitary napkin machine of the class described, the combination of means for severing end portions from a strip of wadding to form pads, a pivoted support for successively receiving the pads, means for propelling a strip of wrapping material, means for successively feeding the pads from said pivoted support to said wrapper strip, pivoted means for holding a substitute pad in position overlying the normal path of movement of pads from the first mentioned pivoted support to said wrapper strip, automatic means for effecting swinging movement of both of said pivoted supports in synchronized relation for discharging a pad on said first mentioned support and for depositing a pad from said second mentioned support in the normal place of said discharged pad, and timing means adapted to be set into operation prior to the cutting of a pad portion from the strip for effecting operation of said automatic means when such pad portion of the strip is severed from the strip and deposited as a pad on the first mentioned support, and means for automatically stopping the operation of said timing means upon completion of a cycle of operation thereof.

11. In a sanitary napkin machine of the class described, the combination of means for successively severing end portions from a strip of wadding to form pads, a pivoted support for successively receiving said pads, means for propelling a strip of wrapper material, means for successively feeding the pads from said pivoted support to said wrapper strip, pivoted means overlying the normal path of movement of pads from said support to said wrapper strip and located intermediate said support and the strip for positioning a pad over said path of movement, solenoids for controlling said pivoted pad supporting means, switch means for actuating said solenoids, selectively operable timing means for controlling said switches comprising a driven shaft and cams on said shaft for operating said switches, electric means for controlling the operation of said timing means, a switch controlling said electric means, and a cam on said shaft for controlling said switch.

12. In a sanitary napkin machine of the class described, the combination of means for severing end portions from a strip of wadding to form pads, a pivoted support for successively receiving the pads, means for propelling a strip of wrapping material, means for successively feeding the pads from said pivoted support to said wrapper strip, pivoted means for holding a substitute pad in position overlying the normal path of movement of pads from the first mentioned pivoted support to said wrapper strip, automatic means for effecting swinging movement of both of said pivoted supports in synchronized relation for discharging a pad on said first mentioned support and for depositing a pad from said second mentioned support in the normal place of said discharged pad, and means selectively operable prior to the cutting of a pad portion from the strip for effecting operation of said automatic means when such pad portion of the strip is severed from the strip and deposited as a pad on the first mentioned support, said last mentioned means comprising a driven member, a rotatable member having cams for operating said pivoted supports, clutch means for connecting said driven and rotatable members, said clutch means having engaging positions each corresponding to a pad section so as to produce a predetermined relationship between a given pad portion and said cams for properly timed operation of said pivoted supports.

CHARLES J. GREINER.
OSCAR T. THOMPSON.